March 24, 1953     H. R. GAMBLE     2,632,621
VALVE MECHANISM
Filed Sept. 23, 1950
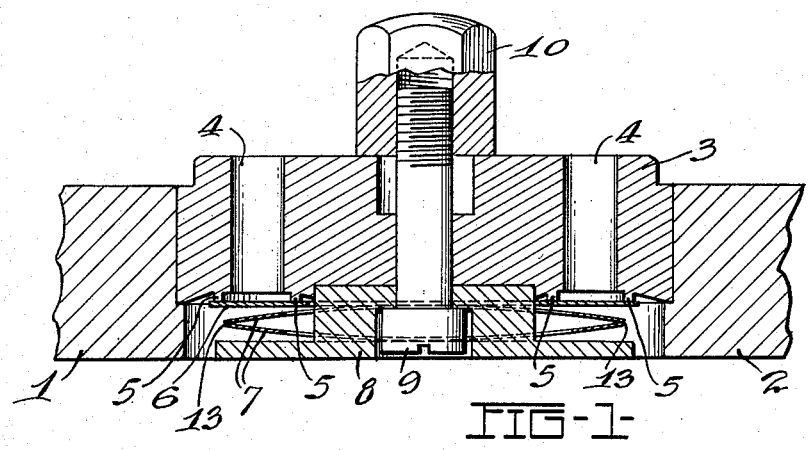
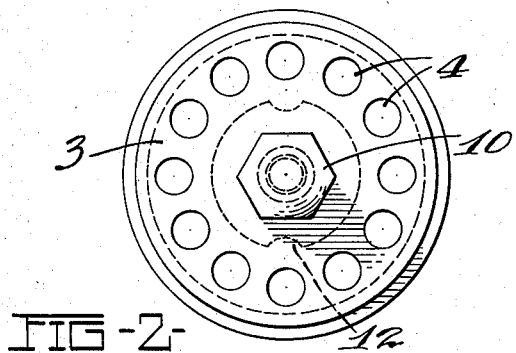
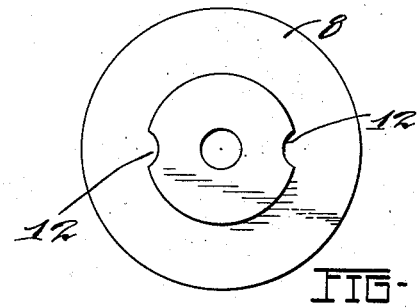
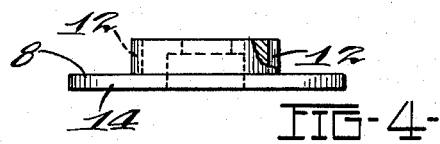
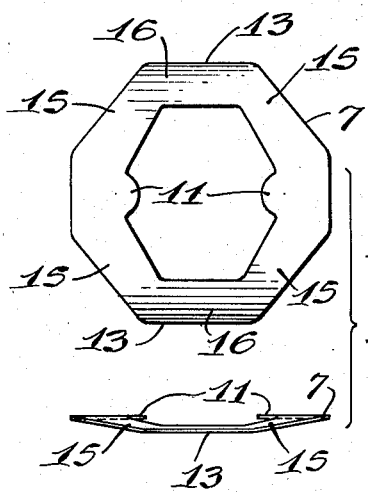
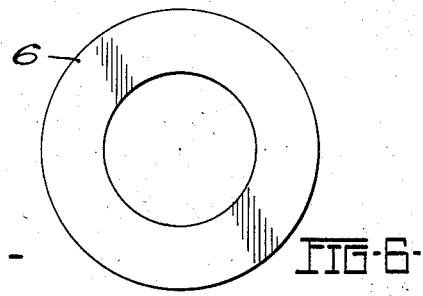
Inventor:
HAROLD R. GAMBLE.
By W. P. Carr
Attorney Patented Mar. 24, 1953

2,632,621

UNITED STATES PATENT OFFICE 2,632,621

VALVE MECHANISM

Harold R. Gamble, Toledo, Ohio, assignor to The De Vilbiss Company, Toledo, Ohio, a corporation of Ohio Application September 23, 1950, Serial No. 186,383

5 Claims. (Cl. 251—119)

My invention relates to a valve mechanism particularly adapted for use with air compressors. In such mechanisms the valve is usually moved from its seat by air pressure and returned to its seat by spring tension.

An object of this invention is the provision of a valve mechanism in which the spring means has a minimum amount of flexure.

Another object is the provision of spring means which operates with an improved cushioning effect upon the movement of the valve.

A further object is the provision of a valve spring which will withstand long usage without failure.

An additional object is a valve spring which flexes with little sliding contact with the valve and other adjacent parts.

These and other objects are attained through the use of the novel valve spring design and arrangement described herein and disclosed in the accompanying drawings in which—

Figure 1 is a central vertical section of a valve mechanism embodying my invention;

Figure 2 is a plan view thereof;

Figure 3 is a plan view of the spring retainer;

Figure 4 is a side elevation with a portion broken away of the same element;

Figure 5 is a plan view and a side elevation of the valve spring; and

Figure 6 is a plan view of the flat ring valve.

Referring to the drawings in more detail, in Figure 1 is illustrated the valve mechanism in assembled relation and mounted in a cylinder wall, the broken away portions of which are indicated at 1 and 2. The valve body 3 has an annular series of ports 4. On either side of the lower ends of the series of ports are annular ridges 5 providing the closure seat for ring valve 6. The latter is held against the seat by octagonal plate springs 7. These are formed from stampings of Swedish spring steel sheet .010" in thickness. The springs are bowed and preferably used in couples with their concave sides in opposing relation as shown in Figure 1. They may also be effectively utilized in reverse relative position with their convex sides together; or may be employed singly. A spring retainer 8 is secured to the valve body 3 by bolt 9 and nut 10.

By the protrusion of ears 11 from the inner periphery of the springs 7 into the complementary grooves 12 on the spring retainer 8 the springs are held against any rotary movement and to a definite axial path. This is essential when the springs are used in couples as they must be positioned with their bowed dimensions running in the same direction. Otherwise, as may be easily perceived, the springs would telescope or interlock to various degrees and would lack a definite overall effective thickness. When utilized singly the springs may be guided around a central post instead of by ears 11.

In the preferred arrangement as illustrated in Figure 1 the springs contact each other along the edges 13 of their depressed ends which are best shown in Figure 5. The center portions of their convex sides, adjacent ears 11, bear oppositely against the valve ring 6 and the surface of the flange 14 on the spring retainer 8. As the ring valve 6 opens under the force of air pressure the springs 7 flatten out, with the flexing action distributed uniformly along the bowed dimension. This uniformity is particularly desirable as it avoids concentrated flexing and undue stress in any given area which is the frequent cause of spring failure.

The valve spring is considered similar in stress load to a beam supported at both ends and having a load at its center. Accordingly the moment diagram of the valve spring between edges 13 would comprise a downwardly facing isosceles angle, indicating a peak load at the center declining at an even rate toward both ends. Plate springs 7 are designed to proportionally resist this load distribution through a major part of their extent and thus to even out the resulting flexure. This is accomplished by narrowing the width of the arms 15 as they extend from the center of the spring toward the edges 13.

While it is recognized that the strength of the valve spring could also be graduated by tapering its thickness, such a construction would be more expensive to form and doesn't provide the latitude of selection of width and corresponding strength available from a stamping operation.

The transverse strips 16 connecting the sides of the springs provide ample strength and wearing surface along the contact edges 13. The strips also establish particularly high resistance to flexure in these end areas. The flattening of these spring portions is accordingly effected last during the extreme movement of the valve. This final concentrated resistance insures a cushioning action when most needed to prevent too destructive an impact between the valve and the spring means when the valve is stopped at its full open position.

The ability of the valve springs of this invention to withstand long usage without breakage is most evident when they are arranged as illustrated in Figure 1. As so positioned each spring needs to flex an amount to provide space for only one half of the valve opening movement. Upon compression of the springs and as they flatten out there is no sliding contact between parts. This is due to the fact that the opposed surfaces on the valve and the valve spring retainer receive the spring thrust originally only through contact with the high center portion of the bowed sections and subsequently and successively through the balance of the spring surface as the spring straightens out.

Accordingly the longitudinal movement of the springs under compression is in the spring portions without contact with other surfaces except where the edges of the springs rest against each other. As these edges move longitudinally together no significant relative movement occurs. These combined characteristics of the valve spring structure result in a great improvement in wearing ability, well proven by commercial practice. Where serious breakdowns had been previously experienced with springs of a more conventional nature, all such trouble has since been avoided with the substitution of the subject spring means.

This spring design is also capable of superior performance when used in couples with the convex sides facing each other. The advantages of the superior cushioning action secured from the compressing into a final flat form, the division of required flexing action between the springs, and avoidance of wear from contacting movement are all present in this alternate arrangement. While the benefits are not fully secured when a single spring is employed, improved action attends the use of a lone spring in connection particularly with air compressors of moderate capacity.

While I have described a particular embodiment of my invention, it will be understood that this is a preferred form presented for purposes of illustration and that the invention may be modified and embodied in other forms without departing from its spirit or the scope of the appended claims.

What I claim as new and desire to secure by Letters Patent is:

1. In a valve mechanism for an air compressor a ported valve seat member, a valve and spring retainer element, said element including a guiding post section and a lateral flange portion, means for holding the member and element together with the top of the post section against the member and the flange defining with the member an annular valve and valve spring chamber around the post section, a flat annular valve in the chamber, a generally flat annular spring in the chamber compressed between the valve and the flange and normally holding the valve against the seat member, said spring having an outer periphery of octagonal contour and an inner periphery roughly corresponding thereto, and being bowed in one dimension terminating at the ends with straight parallel edges, and a pair of guiding ears extending toward each other from opposite sides of the inner periphery across the center of the bowed dimension and into complementary grooves in the guiding post section of the retaining element whereby the spring is held against rotary movement.

2. In a valve mechanism as set forth in claim 1 a second flat annular spring bowed in the same dimension as the first spring, the concave sides of the springs facing each other, and the springs contacting each other along the straight parallel edges at the ends of their bowed dimensions.

3. A valve mechanism for an air compressor of the type having a reciprocable valve and a seat therefor, characterized by a valve spring of generally flat annular form uniformly bowed transversely with straight parallel edges on the opposite ends of the bowed dimension, said valve spring having a center opening forming, with the outer spring contour, arms converging from the mid-section of the spring toward the parallel edges, said arms having a tapering width toward said edges.

4. A valve mechanism for an air compressor of the type having a reciprocable valve and a seat therefor, characterized by a pair of valve springs of generally flat annular form uniformly bowed throughout an entire transverse dimension with straight parallel edges on the opposite ends of the bowed dimension, said valve springs being one above the other with oppositely bowed surfaces adjacent, and guiding means retaining the springs in a relative position in which their bowed dimensions extend in the same direction and the straight edges of each spring are parallel with the straight edges of the other spring, contact of the guiding means with each spring being restricted to points spaced across the center of the bowed dimension of the spring.

5. A valve mechanism for an air compressor of the type having a reciprocable valve and a seat therefor, characterized by a pair of valve springs of generally flat annular form uniformly bowed throughout an entire transverse dimension with straight parallel edges on the opposite ends of the bowed dimension, said springs being bowed in the same dimension, the concave sides of the springs facing each other, and the springs contacting each other along the straight parallel edges at the ends of their bowed dimensions.

HAROLD R. GAMBLE.

REFERENCES CITED

The following references are of record in the file of this patent:

UNITED STATES PATENTS

| Number | Name | Date |
|---|---|---|
| 502,750 | O'Neil | Aug. 8, 1893 |
| 1,451,224 | Johns | Apr. 10, 1923 |
| 1,464,837 | Wikander | Aug. 14, 1923 |
| 1,595,468 | Holdsworth | Aug. 10, 1926 |
| 1,707,306 | Holdsworth | Apr. 2, 1929 |
| 1,768,842 | Holdsworth | July 1, 1930 |
| 2,353,967 | Osgood | July 18, 1944 |

FOREIGN PATENTS

| Number | Country | Date |
|---|---|---|
| 333,983 | Germany | of 1929 |